June 9, 1931. H. C. ARMSTRONG 1,809,795
WHEEL STRUCTURE
Filed Nov. 27, 1926
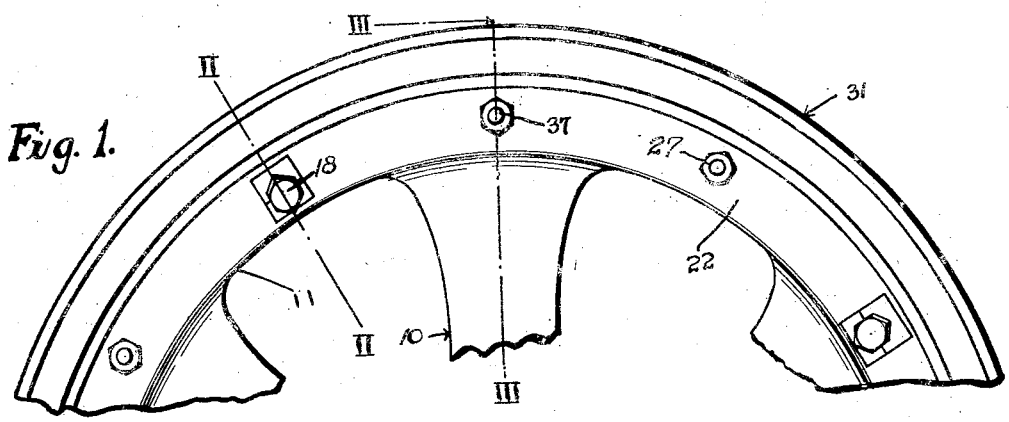
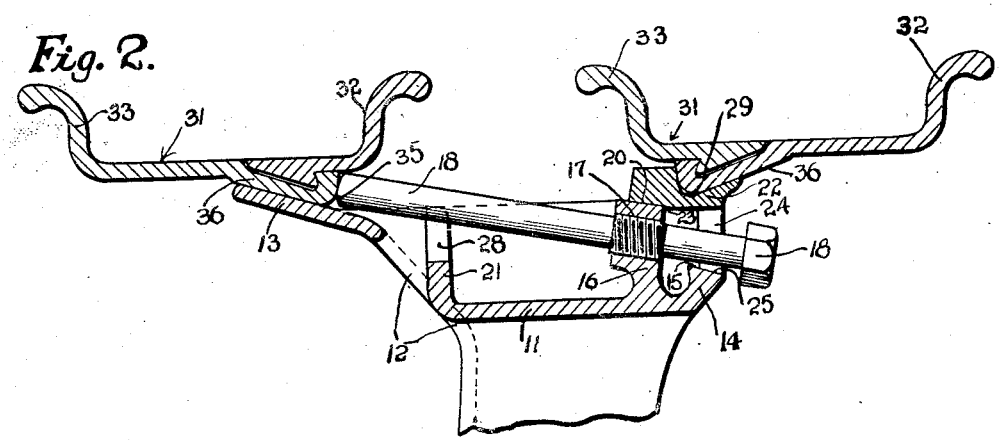
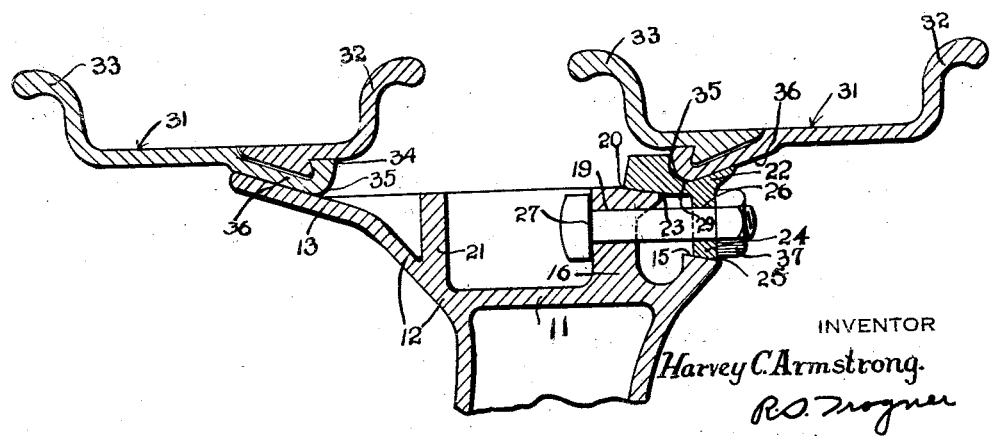
INVENTOR
Harvey C. Armstrong.
ATTORNEY Patented June 9, 1931

1,809,795

UNITED STATES PATENT OFFICE

HARVEY C. ARMSTRONG, OF AKRON, OHIO, ASSIGNOR TO THE GOODYEAR TIRE & RUBBER COMPANY, OF AKRON, OHIO, A CORPORATION OF OHIO

WHEEL STRUCTURE

Application filed November 27, 1926. Serial No. 151,106.

My invention relates to the mounting of vehicle wheels and more particularly to assemblies known as dual mountings wherein a plurality of resilient tires are secured upon a common hub.

Mountings of the above designated character have been in use for some time on heavy motor vehicles, such as busses, and have been employed in numerous forms, none of which, however, has been adopted as entirely satisfactory.

It is the primary object of the invention to provide a mounting of the type indicated which will overcome the disadvantages of the older types of mountings, and that shall be practical, economical of manufacture, light in weight, durable, and simple in the assembly of its several parts.

Further objects and advantages will become apparent from a perusal of the following detailed description of a preferred structural embodiment incorporating the principles of the invention, reference being made to the accompanying drawings, wherein:

Fig. 1 is a fragmentary side-elevational view of a wheel embodying the invention;

Fig. 2 is a cross-sectional view taken along the line 2—2 of Fig. 1, illustrating the means for securing the inner tire rim in position; and, Fig. 3 is a cross-sectional view taken along the line 3—3 of Fig. 1, illustrating the securing means for the outer tire rim.

Referring to the drawings, a wheel body 10, preferably of cast metal, is provided with a substantially flat peripheral portion 11, which may be formed integrally therewith, or subsequently secured thereto. The portion 11 is flared outwardly at its inner side, as indicated by the reference numeral 12, and it terminates in an inclined frustro-conical rim supporting surface 13. The opposite portion of the periphery 11 is provided with a laterally extending flange 14 that is formed with an annular tapered surface 15.

An annular rib 16, formed on the portion 11 adjacent the flange 14, is provided with a plurality of spaced and inclined threaded apertures 17 adapted to receive bolts 18, and a plurality of horizontally disposed apertures 19, that alternate with the apertures 17. The sets of apertures 17 and 19 are adapted to receive bolts by means of which rims are held in position. The outer surface of the rib 16 is formed with a tapered face 20, to provide a rim supporting seat, as described in detail hereinafter.

A radially disposed circumferentially extending reinforcing rib 21 is formed on the portion 11 adjacent the outwardly flared portion 12 and it is provided with slots 28 that are aligned with the apertures 17, to permit the passage of the bolts 18 therethrough.

A transversely split ring 22 is adapted to be disposed on the tapered face 20 of the rib 16, and it is formed with a coacting beveled inner surface 23. The ring 22 is formed with an inwardly extending radial flange 24, provided with a tapered face 25, which bears upon the beveled surface 15 formed on the rib 14. Apertures 26, formed in the flange 24, are provided for the reception of bolts 27 that extend through the rib 16, to secure the ring 22 in position, and slots or recesses 28, in alignment with the threaded apertures 17, are also provided to permit of access to the bolts 18. The ring 22 has an annular tapered groove 29 formed on its outer surface, which serves as a seat for a rim 31 disposed on the member 22.

While the rim 31 may be of any desired type, it is preferred to utilize one comprising interfitting members 32 and 33, one of which, 32, is provided with an inclined circumferential tapered rib 34, formed on its under side to provide an abutment 35 and a beveled surface 36. The rims for the inner and outer tires are identical in construction.

In mounting the wheel assembly the inner rim 31 is placed around the wheel body 10 with its beveled surface 36 engaging the rim supporting surface 13 of the member 12. The bolts 18 are then adjusted, with the ends of the bolts contacting with the abutment 35 to force the beveled surface 36 into positive engagement with the rim supporting surface 13. This completes the mounting of the inner rim.

The ring 22 is then so placed within the outer tire rim 31 that the tapered groove 29 engages the abutment 35 and beveled surface 36 thereof. The parts thus assembled are placed on the wheel 10, with the beveled surfaces formed on the ring 22 engaging the surfaces 15 and 20 of the flange 14 and the rib 16, and they are secured thereon by means of nuts 37 on the bolts 27.

It will readily be appreciated from the foregoing description that there is provided a dual rim mounting which is exceedingly simple in construction, having comparatively few parts, and which is capable of quick assembly. These features make the device entirely practical and economical to manufacture.

While but one embodiment of the invention has been described in detail, it will be apparent that numerous deviations therefrom may be made without departing from the spirit and the scope thereof, and I desire that only such limitations be imposed as are set forth in the following claims.

What I claim is:

1. A wheel mounting comprising a felloe having an outwardly flared tapered portion forming an inner tire rim seat, an annular rib having a tapered outer surface and having a plurality of inclined screw-threaded apertures formed therein, a radial rib formed on the felloe and having slots cut therein and in registry with the inclined apertures, a tire rim formed with an inner circumferential tapered portion adapted to engage the rim seating surface on the felloe and means including a plurality of bolts disposed through the inclined apertures and the slots and abutting the tapered portion of the rim to secure the rim upon the felloe.

2. A wheel mounting for dual rims including a felloe formed with a flared rim-supporting portion and wth a flange terminating in an annular tapered seat, an annular rib extending radially from the felloe intermediate the flared portion and the flange and also formed with an annular tapered seat, a rim-supporting ring formed with inclined surfaces for engagement respectively with the tapered seats of the flange and rib, means traversing the rib for engagement with a rim to position it upon the flared rim-supporting portions, and means traversing the rib and engaging the ring to secure the latter in operative position.

3. A wheel mounting for dual rims including a felloe formed with a flared rim-supporting portion and with a flange terminating in an annular tapered seat, an annular rib extending radially from the felloe intermediate the flared portion and the flange and also formed with an annular tapered seat, a rim-supporting ring formed with inclined surfaces for engagement respectively with the tapered seats of the flange and rib, means traversing the rib for engagement with a rim to position it upon the flared rim-supporting portions, and means traversing the rib and engaging the ring to secure the latter in operative position, both of said means being operable from the same side of the wheel.

4. A wheel mounting for dual rims including a felloe formed with a flared rim-supporting portion and with a flange terminating in an annular tapered seat, an annular rib extending radially from the felloe intermediate the flared portion and the flange and also formed with an annular tapered seat, a rim-supporting split ring formed with inclined surfaces for engagement respectively with the tapered seats of the flange and rib, means obliquely traversing the rib for engagement with a rim to position it upon the flared rim-supporting portions, and means horizontally traversing the rib and engaging the ring to secure the latter in operative position.

5. A wheel mounting for dual rims including a felloe formed with a flared rim-supporting portion and with a flange terminating in an annular tapered seat, an annular rib extending radially from the felloe intermediate the flared portion and the flange and also formed with an annular tapered seat, a rim-supporting ring formed with inclined surfaces for engagement respectively with the tapered seats of the flange and rib, a series of bolts threaded obliquely through the rib for engagement with a rim to position it upon a flared rim-supporting portion, and a series of bolts traversing the rib and engaging the ring to secure it in position.

6. A wheel mounting for dual rims including a felloe formed with a flared rim-supporting portion and with a flange terminating in an annular tapered seat, an annular rib extending radially from the felloe intermediate the flared portion and the flange and also formed with an annular tapered seat, a rim-supporting ring formed with inclined surfaces for engagement respectively with the tapered seats of the flange and rib, a series of bolts threaded obliquely through the rib for engagement with a rim to position it upon a flared rim-supporting portion, and a series of bolts traversing the rib and engaging the ring to secure it in position, all of the bolts being operable from the same side of the wheel.

7. A wheel mounting for dual rims including a felloe formed with a flared rim-supporting portion and with a flange terminating in an annular tapered seat, an annular rib extending radially from the felloe intermediate the flared portion and the flange and also formed with an annular tapered seat, a rim-supporting ring formed with inclined surfaces for engagement respectively with the tapered seats of the flange and rib, a slotted reinforcing web extending radially from the felloe, a series of bolts obliquely traversing the rib and positioned in the slots of the web for positioning a rim upon the rim-supporting portion and means traversing the rib and engaging the ring to secure the latter in operative position.

8. A wheel mounting including a felloe formed with a flared rim supporting portion and with a flange terminating in an annular seat, an annular rib extending radially from the felloe intermediate the flared portion and the flange and also formed with an annular seat, said flange and rib being adapted to support a second rim, and means obliquely traversing the rib for engagement with a rim to position it upon the flared rim supporting portion.

9. A wheel mounting including a felloe formed with a flared rim supporting portion and with a flange terminating in an annular seat, an annular rib extending radially from the felloe intermediate the flared portion and the flange and also formed with an annular seat, said flange and rib being adapted to support a second rim, and means obliquely traversing the rib for engagement with a rim to posititon it upon the flared rim supporting portion, said means comprising a screw, threaded through the rib.

10. A wheel mounting including a felloe formed with a flared rim supporting portion and with a flange terminating in an annular seat, an annular rib extending radially from the felloe intermediate the flared portion and the flange and also formed with an annular seat, said flange and rib being adapted to support a second rim, and means obliquely traversing the rib for engagement with a rim to position it upon the flared rim supporting portion, said means being disposed radially outwardly of the seat of the flange.

In witness whereof, I have hereunto signed my name.

HARVEY C. ARMSTRONG.